June 5, 1956

T. W. WINSTEAD 2,748,805

REINFORCED SPIRAL PLASTIC PIPE

Filed March 2, 1953

INVENTOR
THOMAS W. WINSTEAD

BY *Semmes & Semmes*

ATTORNEYS

June 5, 1956 T. W. WINSTEAD 2,748,805
REINFORCED SPIRAL PLASTIC PIPE
Filed March 2, 1953 4 Sheets-Sheet 2

INVENTOR
THOMAS W. WINSTEAD

BY Lemmes & Lemmes
ATTORNEYS

June 5, 1956  T. W. WINSTEAD  2,748,805
REINFORCED SPIRAL PLASTIC PIPE
Filed March 2, 1953  4 Sheets-Sheet 3

INVENTOR
THOMAS W. WINSTEAD

BY *Semmes & Semmes*

ATTORNEYS

June 5, 1956  T. W. WINSTEAD  2,748,805
REINFORCED SPIRAL PLASTIC PIPE
Filed March 2, 1953  4 Sheets-Sheet 4

INVENTOR
THOMAS W. WINSTEAD

BY Semmes & Semmes

ATTORNEYS

United States Patent Office 2,748,805
Patented June 5, 1956

2,748,805

REINFORCED SPIRAL PLASTIC PIPE

Thomas W. Winstead, Baltimore, Md., assignor to Hedwin Corporation, Baltimore, Md., a corporation of Maryland Application March 2, 1953, Serial No. 339,825

8 Claims. (Cl. 138—76)

This invention relates to pipe or tubing made of thermoplastic materials and optionally involving reinforcing materials other than thermoplastics.

Reference is made to my copending application Serial No. 338,735, filed December 11, 1953, entitled "Methods for Continuously Producing Plastic Pipe or Tubing."

There is a growing use of and demand in the chemical, mining, agricultural, domestic appliance, building, and other industries for pipe or tubing molded of thermoplastic material, particularly rigid vinyl thermoplastic material, as replacement for pipe or tubing made of metal such as steel, rubber, rubber coated metal, corrosion resistant metal, and of thermosetting material, principally because of the superior physical and chemical properties of molded thermoplastic pipe or tubing. Use of thermoplastic pipe or tubing as a replacement for the priorly used pipe or tubing made of thermosetting material is dictated principally by the fact that thermoplastic pipe or tubing can be made more easily and cheaply than pipe or tubing made of thermosetting material, and by the further fact that thermoplastics have been developed which have better heat resistance and generally better physical and chemical properties than thermosetting materials.

At the present time the available thermoplastic pipe or tubing has the disadvantage that, lacking the strength of metal such as steel, the wall thickness of such thermoplastic pipe or tubing must be made substantially greater for given pressures than equivalent sizes of steel pipe or tubing, in order to provide comparable strength and/or rigidity, and this factor accounts in part for the relatively high cost of thermoplastic pipe or tubing.

Other factors which kept the cost of products of thermosetting material high were the relative slowness and costliness of methods available for compression molding of thermosetting products. Thermoplastic materials can be readily extruded and calendered to form thermoplastic sheeting for example instead of slow and costly laminating of thermosetting material thereby eliminating intermittent or discontinuous steps and operations and which produced only relatively short lengths of the product instead of desirably long and continuous lengths thereof.

Further factors involved in the costliness of present methods for producing thermoplastic pipe or tubing are the high costs of providing and of operating the large extrusion dies and the generally heavy machinery required.

A still further factor involved in the costliness of present methods of producing thermoplastic pipe or tubing is the relatively large percentage of imperfects or rejects characteristic thereof, which must be discarded because of non-uniformity in inside or in outside diameter or because of other defects or deviations from the tolerances set.

Still another factor involved in the costliness of present methods of producing thermoplastic pipe or tubing is the fact that relatively large stocks of such pipe or tubing must be maintained by the manufacturer and/or distributor, at great expense for storage and handling, in order to be able to meet regular and non-recurring orders for such pipe or tubing, because the slowness of production makes it virtually impossible to arrange to make up each order as it is received quickly enough to fill the order on time.

It is accordingly a primary object of the present invention to provide thermoplastic pipe or tubing which avoids the disadvantages and the high costs of prior pipe or tubing outlined above.

Another object of the invention is to provide thermoplastic pipe or tubing which can be made by high speed, continuous methods enabling mass production of thermoplastic pipe or tubing, of either flexible or rigid forms, at substantially lower costs than heretofore attainable.

It is also an object of the present invention to provide thermoplastic pipe or tubing which can be efficiently made in continuous lengths, at high speed on relatively small, lightweight, and inexpensive machinery requiring a minimum of supervision and labor, compared to the relatively slow and costly production of heretofore known products.

Another object of the invention is to provide thermoplastic pipe or tubing having greater relative strength and rigidity while having thinner wall sections than heretofore attainable.

A further object of the invention is to provide thermoplastic pipe or tubing which can be made in continuous lengths in widely different diameters, wall thicknesses, and cross-sectional shapes on the same apparatus.

A still further object of the invention is the provision of more uniform thermoplastic pipe or tubing of the character indicated above having more accurately predetermined outside and inside diameter tolerances, so that waste due to defects and non-uniformity are substantially eliminated in the production of the pipe or tubing.

Another object of the invention is to provide thermoplastic pipe or tubing of the character indicated above which is composed of one or more strips of thermoplastic material wound spirally onto a continuously rotating mandrel, the strip or strips being extruded directly onto the mandrel at such a temperature and state of fluidity that portions of adjacent turns thereof on the mandrel which touch are molecularly fused together, such fusion and the shaping or forming of the pipe or tubing on the mandrel being aided and completed by exertion on the pipe or tubing of soft and conforming external pressure.

Yet another object of the invention is to provide thermoplastic pipe or tubing of the character indicated immediately above wherein contacting portions of adjacent turns of extruded strip are in edge to edge contact or in overlapping contact.

Still another object of the invention is to provide thermoplastic pipe or tubing of the character indicated above which can be made at such high speed that orders for pipe or tubing can be made up as received and the manufacturer or distributor is freed of the necessity of maintaining a large standby stock in order to be in a position to fill orders promptly.

It is also an object of the invention to provide thermoplastic pipe or tubing of the character indicated above which is composed of laminations or layers of the same thermoplastic material or of different but compatible thermoplastic materials, such as high density and low density thermoplastics.

Another object of the invention is the provision of thermoplastic pipe or tubing composed of a plurality of laminations or layers which are molecularly fused together or composed of a plurality of laminations or layers which are adhered together wholly or partly by glue or cement.

Still another object of the invention is to provide thermoplastic pipe or tubing composed of a plurality of laminations or layers, some of which are molecularly fused together and some adhered together by glue or cement.

A still further object of the invention is the provision of thermoplastic pipe or tubing composed of plastic laminations or layers which are not molecularly fused to each other but are molecularly fused to an intermediate lamination or layer, or composed of plastic laminations or layers which are not molecularly fused together but are glued or cemented to an intermediate lamination or layer, the intermediate laminations or layers being either of material physically and functionally similar to the plastic laminations or layers of material differing physically and functionally therefrom, such as various kinds and forms of reinforcing materials, including natural vegetable and animal fibers, synthetic fibers including glass fibers and tape and sheeting woven therefrom, and metal sheets and foils, strands, wires, and netting or screening.

Other important objects and advantageous features of the invention will be apparent from the following description of specific forms of pipe or tubing exemplary of the invention, and of suitable methods for the production thereof, these being set forth for illustrative purposes only, and from the accompanying drawings showing apparatus suitable for carrying out such methods.

Thermoplastic pipe or tubing in accordance with the present invention is formed in continuous lengths and in both rigid and flexible or deformable in cross section by continuously extruding one or more strips of thermoplastic material directly onto a continuously revolving mandrel, continuously spirally winding the strip or strips onto the mandrel with the strip or strips in overlapping relation or in edge to edge relation, in such a way as to form a tube on the mandrel composed of one or of a number of laminations, with the seams between turns staggered, exerting external forming pressure upon the tube on the mandrel so as to press the touching portions of the strips together and effect molecular fusion thereof by means of the heat of extrusion present in the strips and so as to determine surface characteristics of the tube.

The invention further comprises continuous feeding of reinforcing material onto or between portions of strips on the mandrel so that such reinforcing material is either internally embedded so as to form internal reinforcement or forms an external wear and abrasion resisting part of the tubing on either the inside or the outside of the tubing, or both.

The method of the invention also contemplates continuous production of unreinforced plastic tubing of single-ply or single-layer form or of multi-layer or laminated form, the layers of multiple layer forms being of the same or of different compatible thermoplastic material, including high and low density thermoplastic materials, such as vinyl and polyethylene.

Simultaneous extrusion of multiple strips of thermoplastic material is performed by employing a corresponding number of extruder dies located at the same or at opposite sides of the mandrel, but preferably by combining several extruder dies in single extruder heads located at the same or at opposite sides of the mandrel.

The method of the invention also contemplates extruding the thermoplastic strips at relatively high temperatures, ranging upwards from 325° F., and averaging about 350° F., and flowing the strips directly from the extruder dies horizontally or at a downward angle onto the mandrel, with minimal loss of extruder temperature, whereby the strips are in a sufficiently hot and sufficiently fluid condition to be capable of being worked under the relatively light forming pressures used, in the neighborhood of 100 lbs. per square inch, and assure molecular fusion of contacting portions or areas of strips. While the forming pressure placed upon the strips as they are wound spirally onto the mandrel can be exerted by opposed rollers, the forming pressure is preferably exerted in a more resilient and conforming manner by means of an endless pressure belt.

The employment of such a pressure belt in conjunction with an accurately formed mandrel of either round, oval, or polygonal cross section, assures that the hot and fluid strips are formed into a tube having exactly determined inside and outside diameters and predetermined surface characteristics. Tubing of different cross-sectional shapes and diameters can be made merely by changing mandrels and adjusting the pressure rollers or pressure belts.

The invention also contemplates extrusion and winding of strips of incompatible materials with compatible thermoplastic materials, such as strips of thermosetting material. In such case one or more intermediate or intervening agencies for the bonding together of incompatible strips is contemplated, including non-plastic reinforcing material, with the incompatible strips bonded, as by gluing, cementing, or molecular fusion to such intermediate or intervening agency or agencies rather than directly to each other.

The invention primarily involves molecular fusion of strips together, but does not exclude the use of glue or cement for adhering together some laminations or strip components of the tubing.

Reinforcing materials contemplated by the present invention include paper, glass, metal, animal and vegetable fibers, artificial fibers including glass fiber and solid sheets, strands, threads and netting or fabrics and tapes woven therefrom, as well as metal wire, and other similarly suitable material.

The method of the present invention contemplates further the continuous production of continuous lengths of thermoplastic tubing having predetermined desired chemical and physical properties through selection of materials suited to the purposes for which the tubing is intended.

Winding of the tubing onto a reel as it comes off the mandrel is contemplated by the invention, as well as cutting the tubing into desired lengths as it comes off the mandrel, or cutting the tubing lengthwise after its formation on the mandrel and peeling thereof off the mandrel so as to provide sheeting, instead of tubing.

In the drawings, wherein are shown apparatus for carrying out the methods of the present invention and products thereof:

Figure 22:
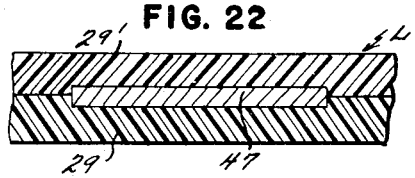
Figure 21:
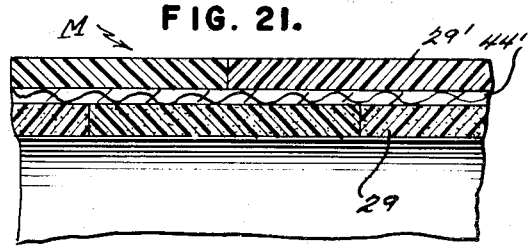
Figure 20:
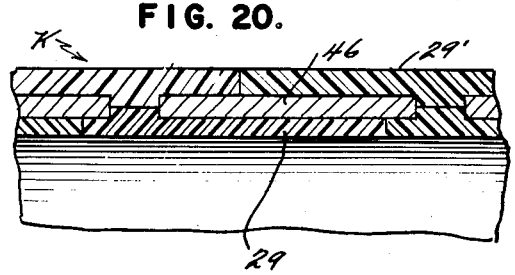
Figure 20 is a view similar to Figure 18, showing the reinforcing lamination as imperforate sheet metal.

Figure 21 is a view similar to Figure 20, showing the reinforcing lamination as mesh or screening of either metal or of natural or synthetic fibers; and Figure 22 is a fragmentary transverse section taken through a dual reinforced strip consisting of superimposed extruded thermoplastic strips with a reinforcing strip therebetween which is narrower than the thermoplastic strips and spaced from their opposite edges, the uncovered marginal portions of the thermoplastic strips being molecularly fused together.

Referring in detail to the drawings, wherein like or similar numerals designate like parts throughout the several views, and particularly to Figures 1 through 9 thereof, the numeral 10 generally designates the illustrated form of apparatus for carrying out methods in accordance with the present invention. This apparatus comprises forming unit 11, which can be associated either a cutting-off unit 12 or a winding or reeling unit 14.

The forming unit 11 is a machine preferably comprising a table-like support 15 from which rise bearing standards 16 and 17, through which is supportably journalled a horizontal mandrel 18, having a free end or delivery end 19. The mandrel 18 can be rotated on its longitudinal axis at predetermined and variable constant and continuous speeds if desired by drive means (not shown) contained in a housing 20 located at the opposite end of the support 15 from the delivery end 19 of the mandrel 18. As thus far described, the machine 11 follows generally the structure of such paper tube winding machines as M. D. Knowlton Company's "No. 4 Spiral Tube Winder."

The cutting-off unit 12 comprises principally a rotating disk blade or knife 21 driven by a motor 22 and turning on an axis parallel to and located at one side of the mandrel 18. The knife 21 is movable from a retracted position into engagement with tubing present on the mandrel 18 so as to cut off a desired length of such tubing already discharged from the delivery end 19 of the mandrel 18. The cutting-off unit 12 is preferably of the same general form and operation as the M. D. Knowlton Company's "No. 5 Single Cut-Off."

The winding or reeling unit 4 consists essentially of a suitably supported spool or drum 23, onto which flexible tubing coming off the delivery end 19 of the mandrel 18 can be wound for storage and transportation by rotation of the drum or spool 23 in the proper direction and at the proper speed by means of a motor 24 connected by gearing 25 with the drum or spool 23. A number of suitable types of winding or reeling units are available in the prior art.

Figure 3:
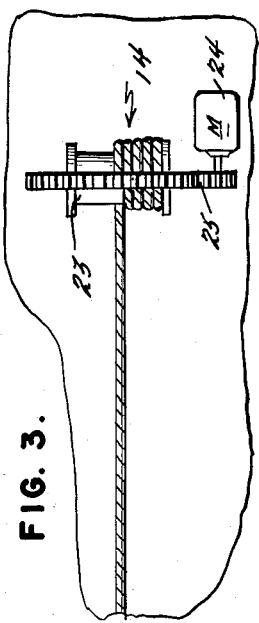
Figure 3 is a fragmentary top plan view of a winder for reeling flexible tubing as it comes off the mandrel, in place of the cut-off of Figure 1.
Figure 1:
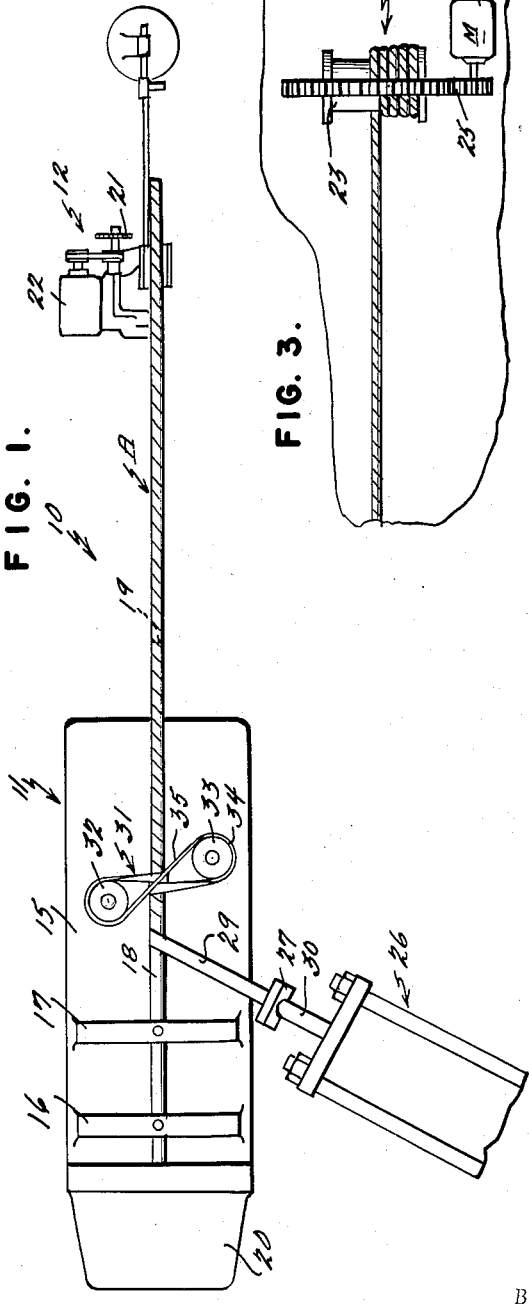
Figure 1 is a fragmentary and diagrammatic top plan view of a form of apparatus including an automatic cut-off, a single die extruder being shown applying a single extruded thermoplastic strip to the rotary mandrel of the apparatus.
Figure 2:
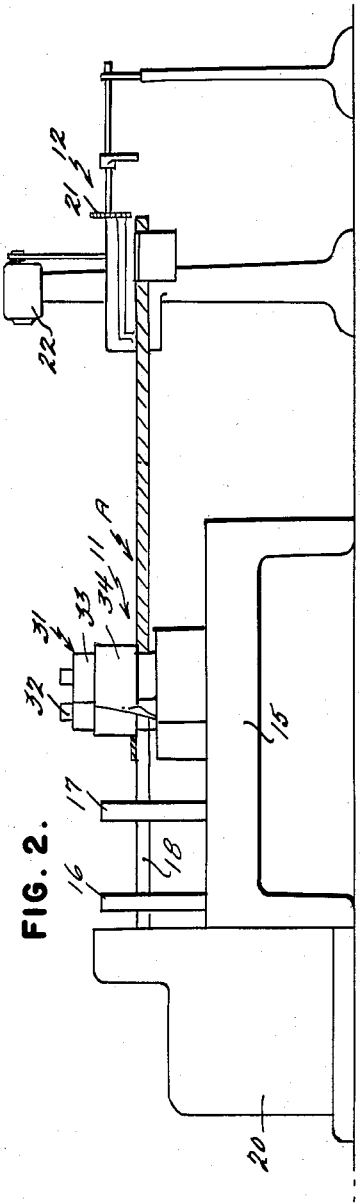
Figure 2 is a side elevation of Figure 1, the extruder being omitted.
Figure 8:
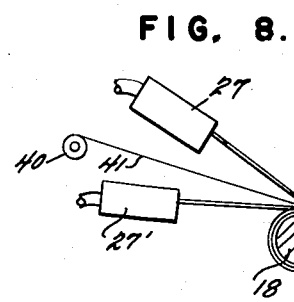
Figure 8 is an enlarged fragmentary transverse vertical section showing feeding of a strip of reinforcing material between two vertically superimposed thermoplastic strips as the thermoplastic strips are extruded onto the mandrel.
Figure 6:
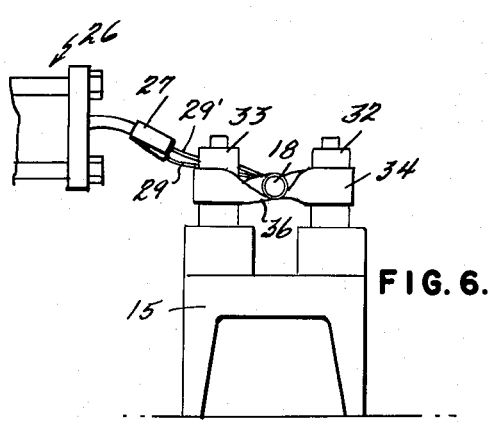
Figure 6 is a fragmentary end elevation of the apparatus showing extrusion of two vertically spaced thermoplastic strips at the same time onto the mandrel.

The forming unit 11 further comprises as shown in Figure 1 of the drawings, a single extruder 26 having an extruder head or die 27 having a slot 28 through which a strip 29 of semi-fluid thermoplastic material is extruded at a temperature ranging between 325° and 450° F. and averaging 350° F. As indicated in Figures 1, 6 and 8, a strip 29 is extruded from the die 27 onto the mandrel 18 substantially horizontally or at a slight downward angle to the horizontal, and at an acute forward angle to the axis of the mandrel corresponding to the pitch of the spiral on which pipe or tubing is to be wound on the mandrel 18. The width and thickness of the strip 29 is determined by the form, size and thickness of the pipe or tubing to be made and a die 27 having a correspondingly dimensioned slot 28 is selected and installed on the conduit 30 of the extruder 26.

For providing forming pressure upon the hot thermoplastic strip 29 as it is continuously wound onto the continuously rotating mandrel 18, the pressure belt assembly 31 is provided. While it is possible to spirally wind a hot extruded thermoplastic strip 29 onto the mandrel 18 with edges of the strip 29 in abutting relation or in overlapping relation, so as to produce molecular fusion of such edge portions of adjacent turns of the strip together, by means of the heat of extrusion present in the strip 29, it has been found more practical and efficient to employ a pressure pad device, such as the pressure belt assembly 31. Reasons for this include the facts that employment of a pressure belt assembly, produces better conformance of the strip 29 to the mandrel 18, better control of the external and internal diameters and of the outside and inside surfaces of the pipe or tubing to predetermined tolerances, and the abutting or overlapping edge portions of adjoining turns of the strip 29 on the mandrel are more efficiently and reliably molecularly fused together. Further, the use of a relatively soft or yielding flexible belt provides adequate forming pressure normal to the strip 29 on the mandrel, while avoiding the excessive pressures and tendencies toward distortion inherent in pressure rollers which result in excessive non-normal pressure components being exerted on the strip 29 as it is wound onto the mandrel 18.

The pressure belt assembly 31 preferably comprises vertical axis pulleys or rollers 32, 33 located at opposite sides of the mandrel 18 and mounted on the support 15. The pulley 33 is located nearer to the free end 19 of the mandrel 18, so that the endless belt 34 extends between the pulleys 32 and 33 at a slight opposite angle to the axis of the mandrel with respect to the extruder head 27. The belt 34 is flat and is preferably at least as wide as the strip 29 being wound on the mandrel 18. The belt 34 has an upper flight thereof twisted and extending across the top of the mandrel 18, as indicated at 35, and a lower flight which is twisted and wrapped around the mandrel 18, as indicated at 36, with an intermediate part of the flight 35 engaging the top of the wrapping of the lower flight 36. As a result, the belt 34 exerts even forming pressure uninterruptedly and uniformly around the entire circumference of the mandrel 18 and hence of the strip 29 wound spirally thereon. The recited arrangement of the belt 34 also aids in advancing the tubing as it is formed on the mandrel 18, toward and beyond the delivery end 19 of the mandrel. Suitable heat resistant lubricant, preferably of a graphitic nature, can be used on the mandrel 18 to prevent sticking of the tubing to the mandrel and ease the advance of the tubing toward the delivery end 19 of the mandrel. The pressure belt assembly 31 may have substantially the form of that disclosed in Patent No. 2,539,450 to Magill dated January 30, 1951, and be driven in time with the mandrel 18 by a suitable drive connection (not shown) to the mandrel drive means contained within the housing 20.

It will be understood that as the strip 29 is extruded and winds onto the mandrel 18 in either edge abutting or edge overlapping manner, adjacent turns of the strip pass through the pressure belt 34 so that the belt exerts continuous and uniform pressure throughout the circumference of the adjacent turns and over the seams between the turns as the adjacent turns pass through the belt 34 and along the mandrel 18 in the direction of the delivery end 19 thereof.

The spiral pipe or tubing A shown in Figures 1, 2 and 9 and 10 is of single ply constitution and primarily rigid, being formed from a single strip 29 of relatively dense rigid thermoplastic material, with edges of adjoining turns in abutted, molecularly fused relation, the strip 29 being extruded from a single slot 28 of a single extruder head 27.

Flexible and diametrically deformable thermoplastic pipe or tubing preferably involves two or more plies or layers of wound flexible thermoplastic strips, with or without intervening laminations of reinforcing material. For the production of such multi-ply flexible tubing two or more extruders such as are designated 26 and 26′ in Figure 7 of the drawings, are necessary. The extruders 26 and 26′ are arranged in longitudinally spaced relation along one side of the mandrel 18 so as to extrude onto the mandrel two thermoplastic strips 29 and 29′, respectively. Or two extruders can be arranged with their heads 27 and 27′ in substantially superimposed relation to each other, as shown in Figure 8. In both cases, a supply reel or drum 40 is provided, either on the support 15 or upon another suitable support, from which reinforcing material 41 is fed to be wound upon the mandrel 18 between the strips 29 and 29′, the reinforcing material 41 being of desired form and composition, such as the wires 42 of the form of tubing shown in Figures 13 and 18 or the non-metallic strands 43 of Figure 19, the woven cloth 44 of Figure 12, the wire mesh 45 of Figures 14 and 21, or the imperforate sheeting 46 of Figure 20.

Figure 5:
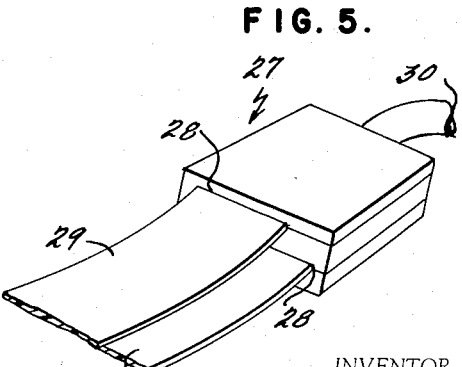
Figure 5 is an enlarged fragmentary perspective view of an extruder head or die having staggered multiple extruder slots extruding multiple thermoplastic strips in mutually overlapping relation.

Further, as exemplified in Figure 5 of the drawings, multiple strips can be extruded from single extruder heads 27 having a plurality of vertically spaced, laterally staggered slots 28, instead of employing a corresponding plurality of extruder heads each having a single strip forming slot 28. Figure 6 shows two vertically spaced strips 29 being extruded and wound together onto the mandrel 18 from the multiple slot extruder head of Figure 5.

Figure 7:
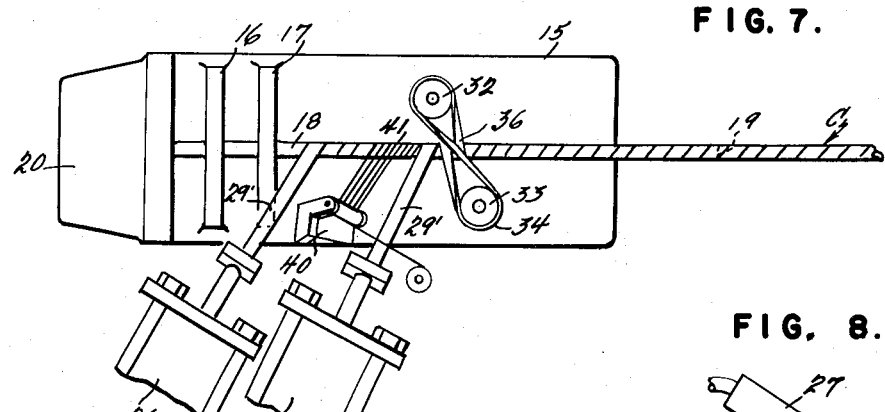
Figure 7 is a fragmentary top plan view showing extrusion of two thermoplastic strips onto the mandrel from the same side of the mandrel and in laterally spaced relation at the same time that a reinforcing strip or group of reinforcing strands is applied to the mandrel so as to produce reinforced tubing thereon.
Figure 4:
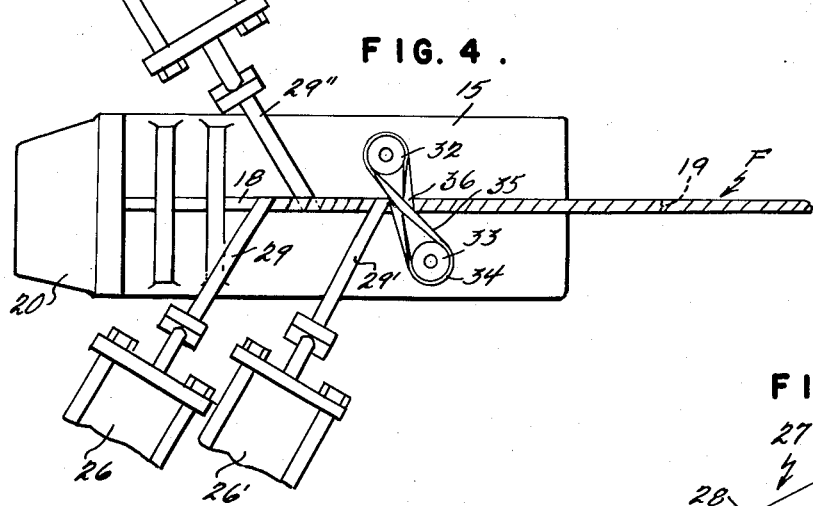
Figure 4 is a fragmentary top plan view showing multiple thermoplastic strips being extruded onto the mandrel from opposite sides of the mandrel by a plurality of extruders.

It is also in accordance with the present invention that where multiple extruders are used, the extruders can be located at opposite sides of the mandrel 18, as exemplified in Figure 4, wherein a third extruder 26″ is located on the opposite side of the mandrel from the extruders 26 and 26′, whereby three-ply tubing of the form shown in Figures 12 to 17 and 19 can be made, it being understood that reels or drums, such as shown in Figure 7, in conjunction with the extruders 26, 26′ and 26″, to supply the laminations of reinforcing material present in the forms of tubing shown in Figures 12, 13, 14 and 19 can be employed.

Figure 16:
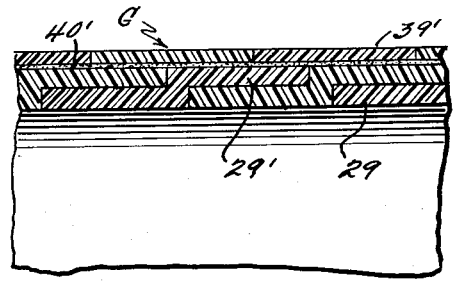
Figure 16 is a similar section showing two superimposed thermoplastic strips wound in edge abutting relation with the seams thereof staggered, the strips and their edges being molecularly fused, and an outer lamination of other plastic material wound on the two thermoplastic strips and bonded to the outer of the two thermoplastic strips by adhesive material, instead of by molecular fusion.
Figure 17:
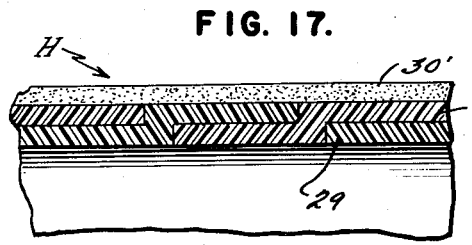
Figure 17 is a similar section showing two high density thermoplastic strips in mutually overlapping and molecularly fused relation, and an outer lamination consisting of a low density thermoplastic strip wound upon and molecularly fused to the outer of the two high density strips, the low density strip being wound in edge abutting relation, the abutting edges being molecularly fused.

The forms of tubing shown in Figures 16 and 17 are made with the three extruder arrangement of Figure 4 by an appropriate relative arrangement of the extruders, with one of the extruders extruding a thermoplastic material different from that being extruded by the other two extruders, in order to provide in the case of Figure 16, the outer strip 39′, which is adhered to the intermediate strip by means of adhesive 40′ instead of being molecularly fused thereto, and in order to provide, in the case of Figure 17, an outer strip 30′ of relatively greatly different density from the other strips, but compatible therewith and molecularly fused to the intermediate strip.

Figure 9:
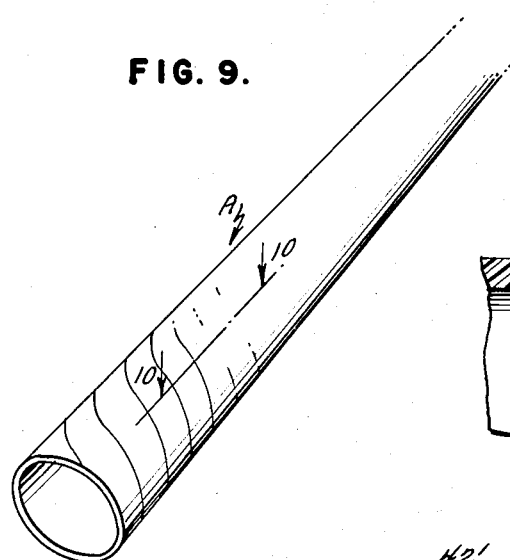
Figure 9 is a fragmentary perspective view of spiral pipe or tubing produced by the method of the present invention.
Figure 10:
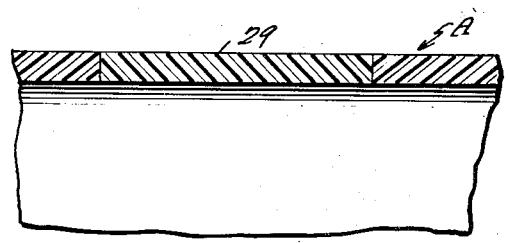
Figure 10 is an enlarged fragmentary longitudinal section taken on the line 10—10 of Figure 9, showing spiral pipe or tubing consisting of a single ply or layer consisting of a strip of extruded thermoplastic material wound with edges thereof in abutting relation and molecularly fused together.

Referring to the various forms of spiral pipe or tubing shown in Figures 9 to 22 of the drawings, the rigid single ply form A of Figure 9 has already been described as made from a single rigid thermoplastic strip wound in edge abutting relation.

Figure 11:
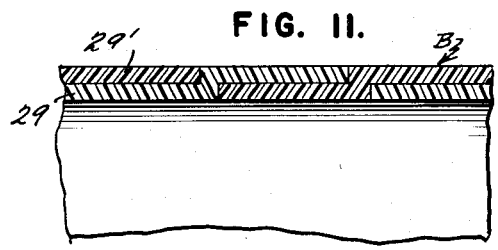
Figure 11 is an enlarged fragmentary longitudinal section taken through a form of such spiral pipe or tubing involving two spirally wound mutually overlapping extruded thermoplastic strips bonded to each other by molecular fusion.

In Figure 11 is shown a basic two-ply form B in which similar or compatible thermoplastic inner and outer strips 29 and 29′ are wound in overlapping relation, the edges of adjoining turns being overlapped as much as 50%.

Figure 12:
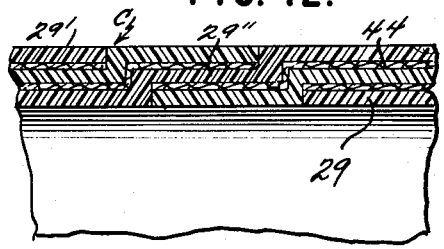
Figure 12 is a similar section showing two laminations of textile reinforcing material bonded between three mutually overlapping thermoplastic strips, the strips being molecularly fused to each other.

Figure 12 shows a three-ply reinforced form C involving an inner ply or strip 29, an outer ply or strip 29′ and an intermediate ply or strip 29″, these strips being capable of being of the same or compatible thermoplastic materials or of materials of this kind which differ in density or rigidity, so as to provide desired chemical and/or physical properties for the tubing. Laminations 44 of woven cloth of natural or artificial fibers are located between the strips 29′ and 29″ and the strips 29 and 29″, the plies or strips 29′ and 29″ being bonded molecularly to each other through the openings or interstices of the cloth, and the plies or strips 29′ and 29″ being molecularly bonded to each other through the openings or interstices of the cloth.

Figure 13:
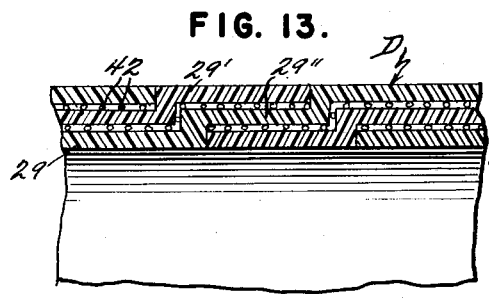
Figure 13 is a similar section showing two laminations of reinforcing wire strands between three mutually overlapping molecularly bonded thermoplastic strips.

Figure 13 shows a form D similar to form C except that the material of the reinforcing laminations 42 is separate metal wire and strands instead of cloth.

Figure 14:
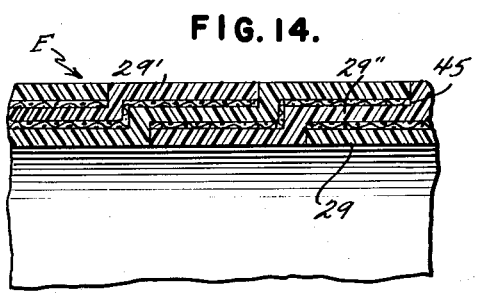
Figure 14 is a similar section showing two laminations of wire mesh between three mutually overlapping thermoplastic strips, bonded to each other by molecular fusion.

In Figure 14 is shown a form E similar to forms C and D except that the reinforcing laminations 45 are of metal wire mesh.

Figure 15:
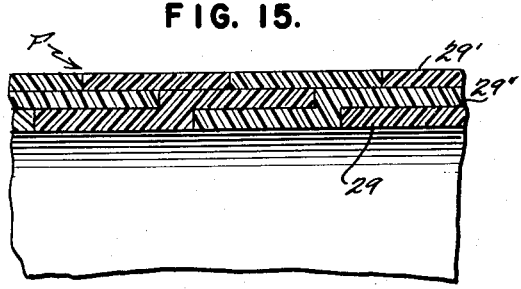
Figure 15 is a similar section showing two thermoplastic strips in mutually overlapping relation and an outer lamination formed of a thermoplastic strip wound thereon in edge abutting relation, the seams between the three strips being in staggered relation, the strips and the edges being molecularly fused together.

In Figure 15 is shown a three-ply form F which is three-ply but is devoid of intervening reinforcing laminations. The outer ply or strip 29′ is in this instance formed with abutting edges while the intermediate and inner plies or strips 29″ and 29, respectively, are overlapped. The outer ply 29′ can be of the same material or of different material compatible with the intermediate layer 29″, such as one of greater density or rigidity or wear resistance or the outer layer 29′ can be of thermosetting material in contrast to the thermoplastic material or materials of the layers 29″ and 29.

Figure 16 shows a three-ply form G in which the inner layer or strip 29 and the intermediate layer or strip, which are of the same or of compatible thermoplastic materials, are molecularly fused together, while the outer layer or strip 39′ is bonded to the intermediate layer 29″ not by fusion but by a suitable adhesive 40′, such as glue or cement. The outer layer 39′ can be of any suitable material depending upon the use for which the form G is intended. It is to be noted that all of the layers have their adjoining turns in edge abutting relation, with the seams of the layers staggered to preclude coincidence of seams and thereby increase the strength of the tubing.

Figure 17 shows a three-ply unreinforced form H which is similar to form F of Figure 15 except that the outer layer or strip 30' is of relatively low density sponge-like thermoplastic material which provides the tubing with a protective external cushion, which can also act as compressible packing where the tubing is inserted in or passed through openings or rigid conduits.

Figure 18:
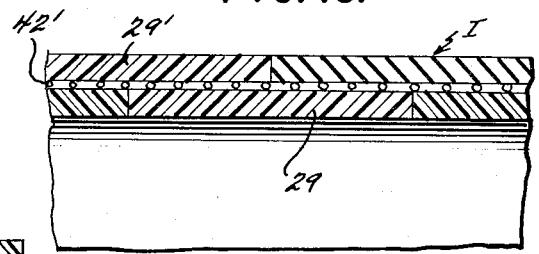
Figure 18 is a similar section showing two superimposed thermoplastic strips wound in edge abutting relation with the seams of the two strips staggered with a layer or lamination therebetween of reinforcing glass or wire strands, the strips being molecularly bonded to each other through the spaces between the strands.

In Figure 18 is shown a two-ply reinforced form I, both the inner and outer layers 29 and 29' being of the same or of compatible thermoplastic material, with adjoining turns of the strips of which they are formed being in edge abutting relation, with the seams thereof staggered, and with a single lamination 42' of separate strands which can be of glass, nylon, rayon or of any other non-metallic, high tensile material, flexible in the case of flexible tubing and rigid in the case of rigid tubing.

Figure 19:
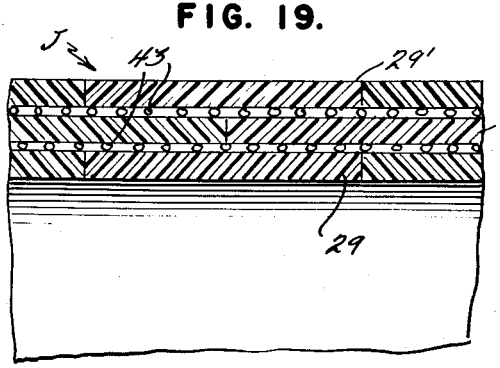
Figure 19 is a similar section showing two reinforcing laminations of glass or wire strands between the facing ones of three superimposed and molecularly fused strips of thermoplastic material, the strips being wound with abutting edges and with their seams in staggered relation.

In Figure 19 is shown a three-ply reinforced form J in which the three layers 29', 29'', and 29 are preferably of similar or of compatible thermoplastic material, the adjoining turns of whose forming strips are in edge abutting relation, with the seams of the layers staggered. The layers 29' and 29'' are molecularly fused to each other around the strands of a lamination 43 consising of fiber glass, and the layers 29'' and 29 being molecularly fused to each other around a second lamination 43 of fiber glass strands.

Figure 20 shows a two-ply form K reinforced with several strips 46 of imperforate flexible metal, such as foil, laid between two thermoplastic layers 29 and 29', the strips 46 being laterally spaced from each other and from edges of the overlying thermoplastic layers, in an arrangement such that the thermoplastic layers bond to each other in the spaces between the foil strips and along the laterally outward edges of the thermoplastic strips at the outer edges of the outermost foil strips.

In Figure 22 is shown another two-ply form L reinforced with a single strip of imperforate foil 47, which can extend the full width of the thermoplastic strips 29 and 29', or, as shown, be more narrow than and spaced from the edges of the thermoplastic strips. In this form, the foil strip 47 can bond directly to the thermoplastic strips. In some cases a better bond of the foil strip with thermoplastic strips of certain types is obtainable by coating the foil strip with vinyl or polyethylene prior to feeding the foil strip or strips between the thermoplastic strips. In other cases it is either preferable or necessary to use an adhesive between the thermoplastic strips and foil strip or strips.

Figure 21 shows reinforced two-ply form M in which the thermoplastic strips 29 and 29' are wound in edge to edge relation with reticulated reinforcing material 44' fed between the thermoplastic strips, the thermoplastic strips being bonded to each other through the interstices of the reinforcing material.

In the foregoing description it has been assumed that the mandrel 18 was continuously rotating during the winding of the strip 29. This is not essential in all forms of tubing being wound. Actually the mandrel may or may not rotate depending upon the exact type of winder being used for the particular job being done. In most cases where the mandrel used is round the mandrel itself does not rotate and the material being wound is pulled both tangent to the axis of the mandrel and at the same time along the axis of the mandrel. Under these circumstances, all movement of the spiral itself is relative to a stationary mandrel. Slippage between the material and the mandrel allows this to occur.

In some cases however, the mandrel is allowed to rotate with the spiral. This occurs when if the shape of the mandrel is other than circular, such as oval, square, or any other similar configuration and then the mandrel must be allowed to rotate and the only relative movement between the material being wound and the mandrel is parallel to its axis thus providing continuous slippage for continuous production.

It is to be understood that although the above described methods and the products thereof mainly involve the heat of extrusion of the extruded thermoplastic strips for bonding the thermoplastic strips to each other, additional heat may be applied by radiant energy or hot gases, such as air, just prior to the feeding of the strips onto the mandrel, if higher temperatures are desired.

It is also within the scope of the invention to use adhesive between the thermoplastic strips which are to be bonded together to improve the bond therebetween or to make it easier to form the bond if necessary.

I claim:

1. Reinforced tubing comprising at least two superimposed strips of thermoplastic material, a layer of reinforcing material interposed between said superimposed strips, said layer of reinforcing material being formed and arranged relative to said superimposed strips to leave portions of the facing sides of said superimposed strips uncovered by said reinforcing layer, said uncovered portions of the superimposed strips being molecularly fused together, said superimposed strips being spirally wound into the form of a tube with adjacent turns of the tube in contact and molecularly fused together.

2. Reinforced tubing comprising at least two superimposed strips of thermoplastic material, a layer of reinforcing material interposed between said superimposed strips, said layer of reinforcing material being formed and arranged relative to said superimposed strips to leave portions of the facing sides of said superimposed strips uncovered by said reinforcing layer, said uncovered portions of the superimposed strips being molecularly fused together, said superimposed strips being spirally wound into the form of a tube with adjacent turns of the tube in contact and molecularly fused together, said reinforcing layer being imperforate and narrower than the superimposed thermoplastic strips.

3. Reinforced tubing comprising at least two superimposed strips of thermoplastic material, a layer of reinforcing material interposed between said superimposed strips, said layer of reinforcing material being formed and arranged relative to said superimposed strips to leave portions of the facing sides of said superimposed strips uncovered by said reinforcing layer, said uncovered portions of the superimposed strips being molecularly fused together, said superimposed strips being spirally wound into the form of a tube with adjacent turns of the tube in contact and molecularly fused together, said reinforcing layer having reticules with the superimposed thermoplastic strips molecularly fused together through the reticules.

4. Reinforced tubing comprising at least two superimposed strips of thermoplastic material, a layer of reinforcing material interposed between said superimposed strips, said layer of reinforcing material being formed and arranged relative to said superimposed strips to leave portions of the facing sides of said superimposed strips uncovered by said reinforcing layer, said uncovered portions of the superimposed strips being molecularly fused together, said superimposed strips being spirally wound into the form of a tube with adjacent turns of the tube in contact and molecularly fused together, said reinforcing layer comprising glass strands in laterally spaced relation to each other.

5. Reinforced tubing comprising at least two superimposed strips of thermoplastic material, a layer of reinforcing material interposed between said superimposed strips, said layer of reinforcing material being formed and arranged relative to said superimposed strips to leave portions of the facing sides of said superimposed strips uncovered by said reinforcing layer, said uncovered portions of the superimposed strips being molecularly fused together, said superimposed strips being spirally wound into the form of a tube with adjacent turns of the tube in contact and molecularly fused together, said reinforcing layer comprising metal wires in laterally spaced relation to each other.

6. Reinforced tubing comprising at least two superimposed strips of thermoplastic material, a layer of reinforcing material interposed between said superimposed strips, said layer of reinforcing material being formed and arranged relative to said superimposed strips to leave portions of the facing sides of said superimposed strips uncovered by said reinforcing layer, said uncovered portions of the superimposed strips being molecularly fused together, said superimposed strips being spirally wound into the form of a tube with adjacent turns of the tube in contact and molecularly fused together, said reinforcing layer comprising metal foil.

7. Reinforced tubing comprising at least two superimposed strips of thermoplastic material, a layer of reinforcing material interposed between said superimposed strips, said layer of reinforcing material being formed and arranged relative to said superimposed strips to leave portions of the facing sides of said superimposed strips uncovered by said reinforcing layer, said uncovered portions of the superimposed strips being molecularly fused together, said superimposed strips being spirally wound into the form of a tube with adjacent turns of the tube in contact and molecularly fused together, said reinforcing layer comprising at least two strips of imperforate sheet metal narrower than the superimposed thermoplastic strips and arranged in laterally spaced relation to each other.

8. Tubing comprising a spirally wound rectangular shaped flat strip of thermoplastic material, edge portions of adjacent windings of the strip being overlapped, reinforcing material interposed between the overlapped edge portions of the strip, said reinforcing material exposing portions of the overlapped edges, said exposed portions being fused to integrate the tubing, said tubing being continuous and having substantially flat parallel inner and outer walls.

References Cited in the file of this patent
UNITED STATES PATENTS

| | | |
|---|---|---|
| 2,225,026 | Welsh | Dec. 17, 1940 |
| 2,321,064 | Broedling | June 8, 1943 |
| 2,383,733 | Parker | Aug. 28, 1945 |
| 2,436,421 | Cork | Feb. 24, 1948 |
| 2,524,522 | Gilmore et al. | Oct. 3, 1950 |
| 2,564,602 | Hurst | Aug. 14, 1951 |
| 2,577,049 | Uline | Dec. 4, 1951 |
| 2,630,157 | Smellie | Mar. 3, 1953 |
| 2,640,501 | Scott et al. | June 2, 1953 |
| 2,661,025 | Brace | Dec. 1, 1953 |
| 2,688,343 | Cuddeback | Sept. 7, 1954 |